United States Patent [19]

Howell

[11] Patent Number: 4,672,321

[45] Date of Patent: Jun. 9, 1987

[54] METHOD AND APPARATUS FOR ELECTROMAGNETICALLY SURVEYING A REMOTE ELONGATE CONDUCTOR EMPLOYING A DETECTOR ASSEMBLY HAVING PLURAL ELECTROMAGNETIC TRANSDUCER ASSEMBLIES

[76] Inventor: Mark I. Howell, 23 Windsor Court, Clifton, Bristol, BS8 4LJ, England

[21] Appl. No.: 580,127

[22] Filed: Feb. 14, 1984

[30] Foreign Application Priority Data

Feb. 16, 1983 [GB] United Kingdom ............... 8304330

[51] Int. Cl.$^4$ .............................................. G01V 3/11
[52] U.S. Cl. ..................................... 324/326; 324/67
[58] Field of Search ......................... 324/67, 326–329, 324/345, 207, 208, 260, 261, 262, 263, 246, 253, 254–259; 336/221

[56] References Cited

U.S. PATENT DOCUMENTS

| 3,187,252 | 6/1965 | Hungerford | 324/343 |
|---|---|---|---|
| 3,617,065 | 11/1971 | Hakata | 324/326 |
| 3,893,025 | 7/1975 | Humphreys, Jr. | 324/326 |
| 3,988,663 | 10/1976 | Slough et al. | 324/326 |
| 4,112,349 | 9/1978 | Weber | 324/326 |
| 4,130,791 | 12/1978 | Slough et al. | 324/326 |
| 4,134,061 | 1/1979 | Gudgel | 324/326 X |
| 4,295,095 | 10/1981 | Thomas et al. | 324/326 |
| 4,325,026 | 4/1982 | Cooper, Jr. et al. | 324/232 |
| 4,387,340 | 6/1983 | Peterman | 324/326 |
| 4,427,942 | 1/1984 | Sole | 324/326 |

FOREIGN PATENT DOCUMENTS

| 0036257 | 9/1981 | European Pat. Off. . |
| 0090482 | 10/1983 | European Pat. Off. . |
| 3216263 | 6/1977 | Fed. Rep. of Germany . |
| 2333256 | 11/1983 | France . |
| 0214943 | 10/1984 | German Democratic Rep. ................................. 324/326 |
| 0066170 | 5/1979 | Japan ................................ 324/326 |
| 0056769 | 4/1982 | Japan ................................ 324/326 |
| 0066885 | 4/1983 | Japan ................................ 324/326 |
| 528568 | 11/1940 | United Kingdom . |
| 1056768 | 1/1967 | United Kingdom ............... 324/67 |
| 2038585 | 7/1980 | United Kingdom ............. 324/326 |
| 1577742 | 10/1980 | United Kingdom . |
| 526838 | 10/1976 | U.S.S.R. ............................. 324/326 |

OTHER PUBLICATIONS

Edwards, "The C-Span Pipeline Survey System–A New Approach to Coating Surveys on Buried Pipelines", *Anti-Corrosion*, Oct. 1986, pp. 6, 7 and 10.
"C-Scan Operator's Manual", Dynalog Electronics Limited, Sep. 1984.

Primary Examiner—Reinhard J. Eisenzopf
Assistant Examiner—Warren S. Edmonds
Attorney, Agent, or Firm—Larson and Taylor

[57] ABSTRACT

Apparatus for locating or monitoring the condition of an inaccessible conductor comprises an antenna for receiving electrical signals due to an alternating current in the conductor. The antenna comprises at least two transducer assemblies each comprising two horizontal, preferably mutually perpendicular, transducers (preferably ferrite-cored coils). The signals induced in the transducers can be processed to give information about the current in the conductor (indicative of its condition) or its depth, independently of the antenna orientation. Use of more assemblies can give better sensitivity. Assemblies including a vertical transducer can avoid the need for the antenna to be over the conductor.

8 Claims, 2 Drawing Figures

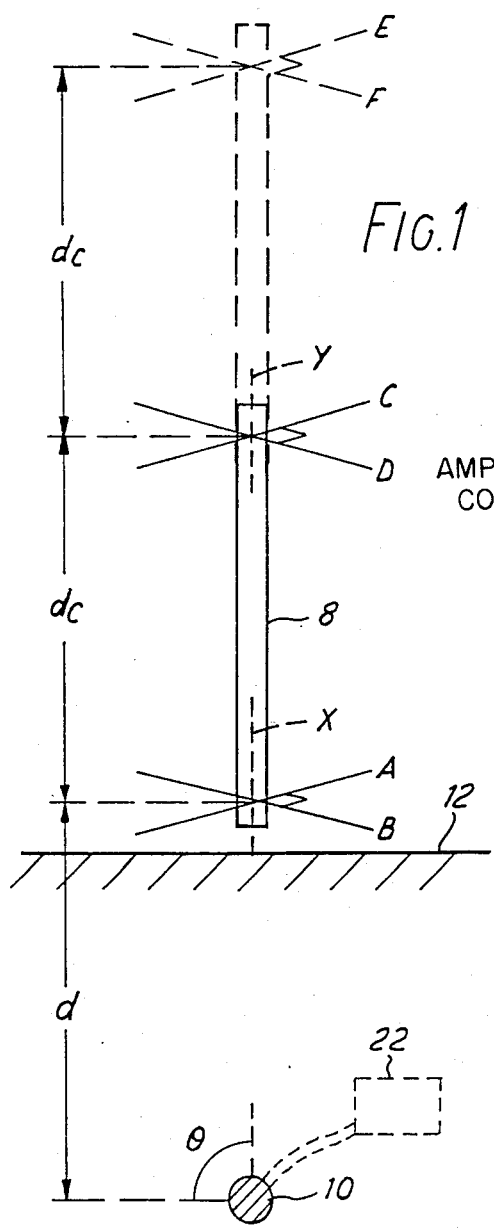
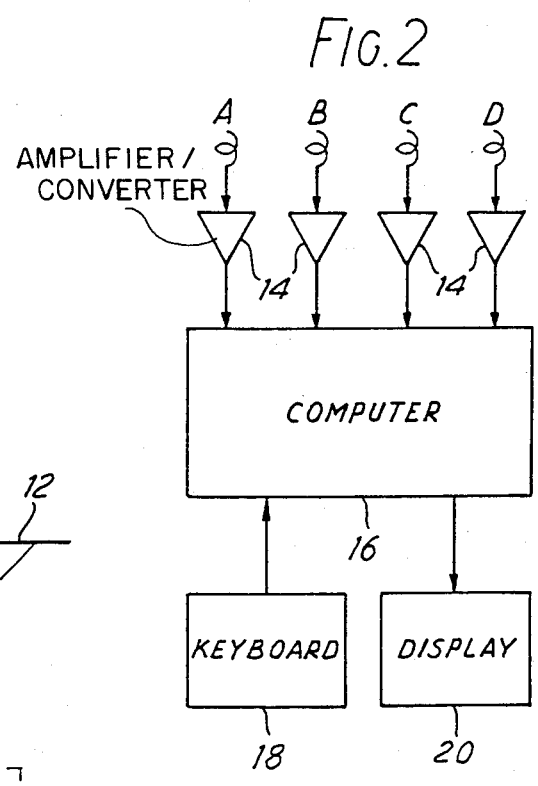

METHOD AND APPARATUS FOR ELECTROMAGNETICALLY SURVEYING A REMOTE ELONGATE CONDUCTOR EMPLOYING A DETECTOR ASSEMBLY HAVING PLURAL ELECTROMAGNETIC TRANSDUCER ASSEMBLIES

BACKGROUND OF THE INVENTION

This invention relates to electromagnetic surveying, and is applicable, for example, to surveying buried elongate conductors such as pipes and cables, for monitoring or location.

It is known to survey a buried elongate conductor by monitoring an a.c. signal current in the conductor. The a.c. signal may be deliberately applied to the conductor for this purpose (directly or inductively) or in some cases, use is made of currents of other origins, such as the mains current in a power cable or naturally induced mains or broader spectrum frequencies in other conductors.

Patent specifications GB No. 15 77 742 and EP No. 0 036 257 show such devices in which there are two or three transducer coils for monitoring the current in the conductor, with their axes arranged in parallel, horizontal, and vertically spaced apart. Naturally, the signals induced in the coil furthest from the conductor are smaller than those in the nearest coil, and this fact is used when processing the signals to give a value indicative of the depth of the conductor below the device. This value is then used as a correction factor, enabling a value indicative of the absolute value of the signal current in the conductor at any particular location to be displayed. If the conductor is in sound condition the signal current will decrease gradually the further one is from the signal source. However, if there is a marked change in the signal current at any location, this is indicative of current leakage caused by a deterioration in the conductor at that location, usually due to deterioration of the protective, insulating wrapping around the conductor. If such deterioration goes unchecked, corrosion of the conductor is likely to occur, and in the case of a pipeline, for example, leakage of the contents of the pipe which may be the result of such corrosion will show up as an even more marked change in the signal current detected. Thus, such monitoring devices can be used both for fault finding and for preventative surveying of buried conductors, without the need for digging.

However, one problem which is common to these known devices is that even once the operator is sure that he is directly over the conductor (so that the depth measurement is reliable), he has to give the device the correct azimuth orientation so as to obtain an accurate reading of signal current intensity. That is, he must physically rotate the coil arrangement about a vertical axis until a maximum signal intensity is obtained. This will occur when the horizontal coil axes are perpendicular to the direction in which the elongate conductor runs. Thus, when taking an accurate reading, the operator must first of all orientate his apparatus by trial and error until a maximum signal is achieved. This is a skilled and time-consuming operation.

SUMMARY OF THE INVENTION

The present invention, at least in one aspect, provides apparatus for electromagnetically surveying an elongate conductor, comprising at least two electromagnetic transducer assemblies for receiving induced a.c. signals from the conductor, the assemblies being vertically spaced apart, and means for processing the signals received by the assemblies to provide data relating to the conductor; characterised in that each transducer assembly comprises at least a pair of transducers with their electromagnetic axes arranged substantially horizontally and in substantially different vertical planes. Preferably, each assembly comprises a pair of transducers having their axes normal to each other. In some embodiments each assembly includes a third transducer whose axis is substantially vertical.

There may be more than two vertically spaced assemblies, preferably with equal vertical spacings. Preferably the processing means includes means for deriving a root mean square value of the signals in each said pair of transducers.

In other aspects, the invention relates to the manner in which such values are processed, and may be applicable to apparatus having other coil arrangements than that described above.

It will be appreciated that many types of electromagnetic transducer are suitable, including air-cored coils and Hall-effect devices. However, the preferred transducers are ferrite-cored coils.

BRIEF DESCRIPTION OF THE DRAWINGS

An embodiment of the invention will now be described by way of example, with reference to the accompanying drawings, in which:

FIG. 1 is a diagrammatic view of an antenna arrangement above a buried elongate conductor, and FIG. 2 is a block diagram of processing means for the output signals of the antenna arrangement.

DESCRIPTION OF THE PREFERRED EMBODIMENTS

Referring to FIG. 1 the antenna comprises four ferrite-cored coils A,B,C,D which are shown as simple lines representing their electromagnetic axes. The coils are arranged in two pairs, A,B and C,D, which are vertically spaced from each other by a known distance $d_c$, for example by fixing the coils to a suitable mounting framework, shown schematically at 8. In each pair, the axes of the coils are substantially horizontal, and at right angles to each other. Ideally, the axes of the coils A, B would intersect each other, and so would those of the coils C, D. But in practice, this is not possible with the preferred ferrite-cored coils, and it is found that provided the coils in each pair are arranged closely one above the other, no problems arise. Alternatively, it would be possible to arrange the coils of each pair so that the end of one abutted the other, with the axes intersecting externally of one or both cores. Having the coils in each pair normal to each other is preferred, because it gives the best results and simplifies the signal processing (discussed below); but with appropriate signal processing it is possible to use coils whose axes are not normal but have substantial components normal to each other.

In use for monitoring the state of a conductor 10 such as a pipe or cable which is buried in the ground 12, or is otherwise inaccessible, e.g. submerged under a river- or sea-bed, the antenna is positioned above it by seeking to maximise the signals picked up by the coils, which are detected as explained below. However, exact positioning is not absolutely critical, and in particular it is not necessary to perform any azimuth orientation of the antenna, as will become apparent.

As shown in FIG. 2, the output of each coil is fed to a respective amplifier and converter 14 which filters and converts the signal to a form suitable for input to a computer 16. This computer comprises a microprocessor and a memory in which is stored a program for carrying out the various data processing operations discussed below. The computer has a simple keyboard 18 or a series of push buttons by means of which the operator can cause the signal inputs to be processed in various ways; and a display 20 on which the results can be displayed. The results can also be stored in the computer memory for subsequent read-out or further processing.

In the following discussion of signal processing, the letters A,B,C,D will be used to denote the amplitude values of the voltage signals picked up by the respective coils A,B,C,D.

The most basic calculation which the computer performs is to evaluate the root mean squares of the input values from the coil pair A,B and from the coil pair C,D; that is, $$\sqrt{A^2 + B^2} \text{ and } \sqrt{C^2 + D^2}.$$

In a uniform alternating magnetic flux, such as might occur naturally in the absence of the conductor 10, these values will be equal and can be rejected by subtraction. However, the signal in each coil picked up from the conductor 10 will be proportional to $1/d \sin \theta$, where d is the depth of the conductor and $\theta$ is the angle between the horizontal and the shortest straight line between the conductor and the coil. When the coil is directly over the conductor, $\sin \theta = 1$, and the signal in each coil depends on d, on the signal current in the conductor, and on the orientation of the coil in the horizontal plane, relative to the conductor. However, by taking the r.m.s. values of two coils normal to each other, the latter orientation dependence is removed, and the operator does not need to orient the antenna.

With the antenna directly over the conductor, therefore, the computer calculates the depth d of the conductor 10, using the formula $$d = \frac{d_c \sqrt{C^2 + D^2}}{\sqrt{A^2 + B^2} - \sqrt{C^2 + D^2}} \quad (1)$$

It then calculates the local signal current amplitude in the conductor at the location concerned, by multiplying the depth value d by one of the r.m.s. signal strength values $\sqrt{A^2+B^2}$ or $\sqrt{C^2+D^2}$. Preferably the $\sqrt{A^2+B^2}$ value is used. The logarithm of this local amplitude is preferably also calculated at this stage, and stored in the computer memory.

The keyboard or push button input from the operator is used to initiate this sequence of events, and also to command the computer to display any desired data on the display 20. Thus, there may be displayed the depth d; either or both of the r.m.s. signal strength readings $\sqrt{A^2+B^2}$ or $\sqrt{C^2+D^2}$; the local signal amplitude; and/or the logarithm of the local signal amplitude.

A particularly useful feature of the computer program is to compare the signal amplitude at one location along the conductor 10 with that elsewhere. This can be done using the logarithmic signal amplitude value which is stored as mentioned above. Subtracting the reading at the present location from that at a previous location gives an indication of the absolute signal attenuation between the two locations, in dB(decibels), mB(millibels; 1 dB=100 mB) or as a percentage, and this can be displayed and/or stored for future reference. Additionally or alternatively, the operator may key in the distance between the two locations on the keyboard 18, and the computer can then divide the attenuation figure by the distance to give the attenuation rate over that distance, in dB/m, mB/m or %/m. This gives a very clear and direct indication of the location of any anomalies in the attenuation rate, and thus makes it very easy to identify the site of any deterioration of the wrapping of the conductor or any corrosion or leakage.

If desired, for increased sensitivity and discrimination, there can be more than two pairs of coils or other transducers, and FIG. 1 shows in dotted lines a third pair E,F, spaced above the pair C,D. Provided the vertical separation between E,F and C,D is the same distance $d_c$ as between A,B and C,D, the depth formula corresponding to formula (1) above is $$\frac{2d_c(\sqrt{C^2 + D^2} - \sqrt{E^2 + F^2})}{\sqrt{A^2 + B^2} - 2\sqrt{C^2 + D^2} + \sqrt{E^2 + F^2}}. \quad (2)$$

The computer is programmed accordingly.

For some purposes it may be preferred to have three coils in each transducer assembly, the third coil (X,Y) in each assembly (A,B; C,D) extending equatorially, i.e. generally vertically, as indicated in broken lines in FIG. 1 for two assemblies. Such triple assemblies can facilitate the determination of the current strength in the conductor 10, and hence the depth d of the conductor, without the need for the antenna to be located directly overhead. The skilled reader will appreciate how the computer 16 can be programmed to effect the necessary calculations (involving vector summation in three dimensions).

The signal current in the conductor, referred to above, may simply be currents which it carries already. The converters 14 may be tuned to accept any desired such frequency, or not, as desired. Alternatively, a separate signal generator 22 may be provided to apply an a.c. signal of a chosen fixed frequency to the conductor at a suitable location, either by direct connection to inductive coupling, and the converters 14 will then be arranged to filter out all other frequencies. If desired, the signal generator could be remotely controlled by the operator as he walks along the conductor. This can be done by a radio link, e.g. operating in the citizen's band.

While the invention has been illustrated above by reference to the preferred embodiments, it will be understood by those skilled in the art that various changes may be made without departing from the spirit and scope of the invention, and it is intended to cover all such changes and modifications by the appended claims.

I claim:

1. A detector assembly for use in electromagnetically surveying a remote elongate conductor, wherein the dectector assembly provides electrical signals from which data relating to said elongate conductor are derivable, the detector assembly comprising:

vertically extending support means; and at least two electromagnetic transducer assemblies supported in vertically spaced relation by the support means; each said electromagnetic transducer assembly comprising a pair of elongate electromagnetic transducers for providing inductive coupling to a said remote elongate conductor so as to generate a respective electrical signal in response to a varying current in said remote elongate conductor; each elongate electromagnetic transducer having a respective electromagnetic axis; said electromagnetic axes extending horizontally; and the electromagnetic axes of each pair of elongate electromagnetic transducers being disposed at substantially the same vertical level and being located in nonparallel vertical planes.

2. A detector assembly according to claim 1 wherein in each said electromagnetic transducer assembly said pair of elongate electromagnetic transducers have their axes normal to each other.

3. A detector assembly according to claim 1 wherein each said electromagnetic transducer assembly includes a third elongate electromagnetic transducer which is adapted to be inductively coupled to a said remote elongate conductor to generate a respective electrical signal in response to a varying current in said remote elongate conductor and which has an electromagnetic axis which is substantially vertical.

4. A detector assembly according to claim 1 comprising at least three of said vertically-spaced electromagnetic transducer assemblies.

5. A detector assembly according to claim 4 wherein the electromagnetic transducer assemblies are at equal vertical spacings.

6. Apparatus for electromagnetically surveying a remote elongate conductor comprising:
vertically extending support means;
at least two electromagnetic transducer assemblies supported in vertically spaced relation by the support means; each electromagnetic transducer assembly comprising a pair of elongate electromagnetic transducers for providing inductive coupling to a said remote elongate conductor as as to generate a respective electrical signal in response to a varying current in said remote elongate conductor; each elongate electromagnetic transducer having a respective electromagnetic axis; said electromagnetic axes extending horizontally; the electromagnetic axes of each pair being disposed at substantially the same vertical level and being located in non-parallel vertical planes; and
signal processing means, electrically connected to said elongate electromagnetic transducers, for receiving as inputs thereto the electrical signals generated by said transducers and for processing said signals to derive data relating to the magnitude of said current in said remote elongate conductor, said signal processing means comprising means for processing the signals from said each pair of elongate electromagnetic transducers to derive for each said pair a respective root mean square signal whose magnitude is dependent on the magnitude of the current in the remote elongate conductor and on the distance between the pair of elongate electromagnetic transducers and the remote elongate conductor but independent of the azimuthal angular orientation of the pair relative to the remote elongate conductor.

7. A method of electromagnetically surveying a remote elongate conductor which carries an alternating electric current using a detector assembly which comprises vertically extending support means; and at least two electromagnetic transducer assemblies supported in vertically spaced relation by the support means; each electromagnetic transducer assembly comprising a pair of elongate electromagnetic transducers for providing inductive coupling to a said remote elongate conductor to generate a respective electrical signal in response to a varying current in said remote elongate conductor; each elongate electromagnetic transducer having a respective electromagnetic axis; said electromagnetic axes extending horizontally; and the electromagnetic axes of each pair being at substantially the same vertical level and being located in nonparallel vertical planes; said method comprising the steps of:
locating said detector assembly over the remote elongate conductor so that the support means extends vertically and said elongate electromagnetic transducers are inductively coupled to said remote elongate conductor and respective electrical signals are thereby generated in said transducers;
processing, for each electromagnetic transducer assembly, the electrical signals of the pair of elongate electromagnetic transducers so as to derive a root means square signal therefrom which is dependent on the magnitude of the current in the remote elongate conductor and is independent of the azimuthal orientation of the detector assembly relative to the remote elongate conductor; and
processing the root means square signals from the electromagnetic transducer assemblies to derive data relating to the magnitude of the current in said remote elongate conductor.

8. A method of electromagnetically surveying a remote elongate conductor using a detector assembly which comprises vertically extending support means; and at least two electromagnetic transducer assemblies supported in vertically spaced relation by the support means; each electromagnetic transducer assembly comprising a pair of elongate electromagnetic transducers for providing inductive coupling to a said remote elongate conductor to generate a respective electrical signal in response to a varying current in said remote elongate conductor; each elongate electromagnatic transducer having a respective electromagnetic axis; said electromagnetic axes extending horizontally; and the electromagnetic axes of each pair being at substantially the same vertical level and being located in non-parallel vertical planes; said method comprising the steps of:
causing said remote elongate conductor to carry an alternating electric current;
locating said detector assembly over the remote elongate conductor so that the support means extends vertically and said elongate electromagnetic transducers are inductively coupled to said remote elongate conductor and respective electrical signals are thereby generated in said transducers;
processing, for each electromagnetic transducer assembly, the electrical signals of the pair of elongate electromagnetic transducers to derive a root means square signal therefrom which is independent of the azimuthal orientation of the detector assembly relative to the remote elongate conductor; and
processing the root means square signals from the electromagnetic transducer assemblies to derive data relating to the magnitude of said current in said remote elongate conductor.

* * * * *